United States Patent [19]

Shimizu et al.

[11] Patent Number: 4,553,988
[45] Date of Patent: Nov. 19, 1985

[54] HIGH-TEMPERATURE FURNACE HAVING SELECTIVELY PERMEABLE MEMBRANES FOR OXYGEN ENRICHMENT

[75] Inventors: Shoji Shimizu, Mukou; Shirow Asakawa, Zama; Yukihiro Saito, Kawasaki; Yoshimasa Ito, Machida, all of Japan

[73] Assignees: Matsushita Electric Industrial Company, Limited; Osaka Gas Co., Ltd., both of Osaka, Japan

[21] Appl. No.: 443,685

[22] Filed: Nov. 22, 1982

[51] Int. Cl.⁴ ............................................. B01D 13/00
[52] U.S. Cl. ........................................ 55/158; 55/208
[58] Field of Search ........................... 55/16, 158, 208

[56] References Cited

U.S. PATENT DOCUMENTS

| | | | |
|---|---|---|---|
| 1,516,642 | 11/1924 | Owen . | |
| 2,444,222 | 6/1948 | Craig | 55/158 X |
| 2,618,357 | 11/1952 | Harlow | 55/158 |
| 3,307,330 | 3/1967 | Niedzielski et al. | 55/158 X |
| 3,369,343 | 2/1968 | Robb | 55/68 X |
| 3,489,144 | 1/1970 | Dibelius et al. | 55/158 X |
| 3,494,465 | 2/1970 | Nyrop | 55/158 X |
| 3,735,558 | 5/1973 | Skarstrom et al. | 55/158 X |
| 3,739,553 | 6/1973 | Aine | 55/158 |
| 3,817,232 | 6/1974 | Nakajima et al. | 55/158 X |
| 3,837,146 | 9/1974 | Faure et al. | 55/158 |
| 3,903,694 | 9/1975 | Aine | 55/16 X |
| 3,930,813 | 1/1976 | Gessner | 55/16 |
| 3,930,814 | 1/1976 | Gessner | 55/16 |
| 3,938,934 | 2/1976 | Frondorf | 431/11 |
| 3,976,451 | 8/1976 | Blackmer et al. | 55/158 |
| 3,979,190 | 9/1976 | Hedman | 55/158 |
| 4,051,372 | 9/1977 | Aine | 55/158 X |
| 4,174,955 | 11/1979 | Blackmer et al. | 55/158 |
| 4,239,793 | 12/1980 | Matsuura et al. | 55/158 X |
| 4,393,113 | 7/1983 | Sugie et al. | 55/158 X |

FOREIGN PATENT DOCUMENTS

| | | | |
|---|---|---|---|
| 24718 | 3/1981 | European Pat. Off. | 55/158 |
| 0054941 | 6/1982 | European Pat. Off. . | |
| 124526 | 9/1980 | Japan | 55/158 |
| 345717 | 6/1979 | U.S.S.R. | 55/158 |

*Primary Examiner*—Robert Spitzer
*Attorney, Agent, or Firm*—Lowe, King, Price & Becker

[57] ABSTRACT

A high-temperature furnace comprising a gas burner (2) for burning a mixture of air and fuel in a combustion chamber (1), and an oxygen enricher (4). The enricher comprises a plurality of cells (13a) each comprising a pair of spaced apart oxygen permeable membranes (14), and a suction fan (12) for drawing air through the spaces between the cells (13a). The cells (13a) are coupled by a manifold (13b) to a vacuum pump (18) which causes the oxygen molecules of the air to pass through the membranes to increase the oxygen content of the air in the cells (13a), the oxygen-enriched air being drawn by the suction pump (18) to the burner (2). Preferably, a heat exchanger (31) is provided for transferring thermal energy of the emissions from the combustion chamber (1) to the air drawn by the suction fan (12) to maintain the oxygen concentration constant for a given operating condition of the combustion chamber.

17 Claims, 4 Drawing Figures ical energy from the emissions to the

HIGH-TEMPERATURE FURNACE HAVING SELECTIVELY PERMEABLE MEMBRANES FOR OXYGEN ENRICHMENT

BACKGROUND OF THE INVENTION

The present invention relates to a high-temperature furnace which is energy efficient and capable of generating heat suitable for manufacture of ceramics, forging of steel and melting glass.

Air usually contains 21 percent oxygen and 79 percent nitrogen and that nitrogen provides no contribution to combustion and hinders the temperature from rising, so that a higher oxygen content results in a higher flame temperature. If the oxygen content is increased from the usual value of 21 percent to somewhere between 23 and 28 percent, the combustion temperature will rise very quickly to a certain level. However, there is no further significant increase in temperature if the oxygen content is increased above 28 percent. Higher flame temperature means a greater difference in temperature between the material to be heated and the flame. Therefore, the amount of calories available for heating increases with such temperature difference and greater energy savings is obtained.

There are several ways of increasing the oxygen content of air. The easiest way is to use an additional oxygen source, but this is costly and requires the utmost care for handling. Another approach involves the use of absorbents such as zeolite. However, the latter has yet to be put into practical use because stabilized operation is not yet guaranteed.

U.S. patent application Ser. No. 331,902 filed Dec. 18, 1981 an assigned to Matsushita Electric Industrial Company, Ltd, discloses an oxygen enriching apparatus having oxygen permeable membranes which are parallel in spaced relationships to allow air to pass therebetween, causing oxygen molecules to selectively pass through the membranes to increase the oxygen content of the air to be utilized.

SUMMARY OF THE INVENTION

It is therefore an object of the present invention to provide a high-temperature furnace which is inexpensive for installation and in maintenance, assures safety in operation and is capable of generating temperatures higher than are available with prior art furnaces.

According to a broad aspect of the present invention there is provided a high-temperature furnace comprising a combustion chamber having a burner for burning a mixture of air and fuel therein and an exhaust outlet for exhausting emissions therefrom to the outside, and means including an oxygen permeable membrane for selectively passing oxygen molecules therethrough for enriching the air with oxygen prior to mixing with the fuel.

Preferably, the oxygen enricher comprises a plurality of longitudinally extending cells which are transversely spaced apart to form a first air passageway therebetween. Each of the cells comprises a pair of oxygen permeable membranes spaced part to form a second air passageway therebetween. A suction fan is provided to cause air to flow through the first air passageway and a vacuum pump causes air to flow through the second air passageway and through a conduit to the burner.

According to a specific aspect of the invention, the furnace further includes a heat exchanger for transferring thermal energy from the furnace emissions to the oxygen-enriched air to achieve higher flame temperature and higher combustion efficiency.

According to a further specific aspect of the invention, the furnace further includes a second heat exchanger for transferring thermal energy from the furnace emissions to the oxygen permeable membrane to increase its operating efficiency.

BRIEF DESCRIPTION OF THE DRAWINGS

The present invention will be described in further detail with reference to the accompanying dawings, in which.

DETAILED DESCRIPTION

Figure 1:
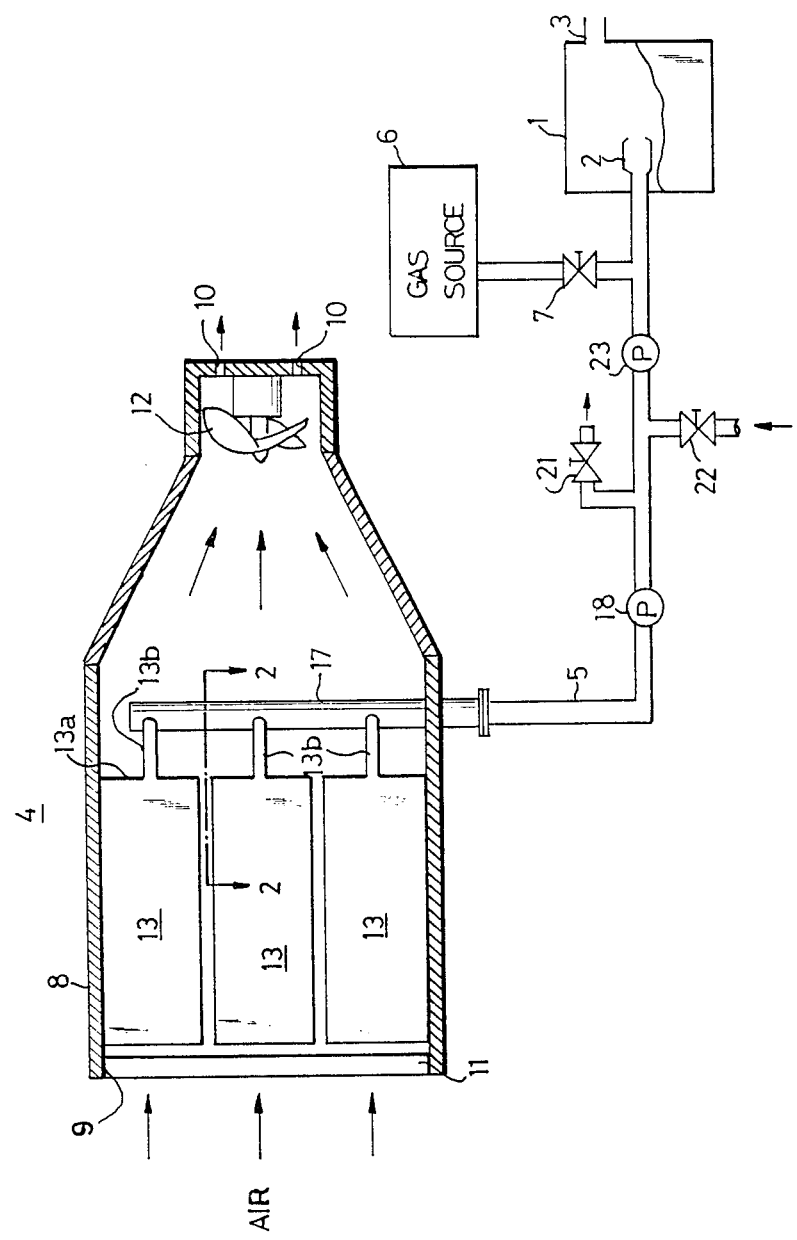
FIG. 1 is a diagrammatic view of a first embodiment of the present invention.

Referring to the drawing, there is shown a first embodiment of the high-temperature furnace according to the present invention. The furnace comprises a combustion chamber 1 having a gas burner or nozzle 2 and an exhaust outlet 3 from which spent gases are exhausted to the outside. An oxygen enriching apparatus generally shown at 4 is provided to supply oxygen-enriched air through a conduit 5 to the burner 2. A fuel source 6 supplies gaseous fuel through a regulator valve 7 to the burner 2 where it is mixed with the oxygen-enriched air at stoichiometric air-fuel ratio for maximum combustion efficiency.

Figure 2:
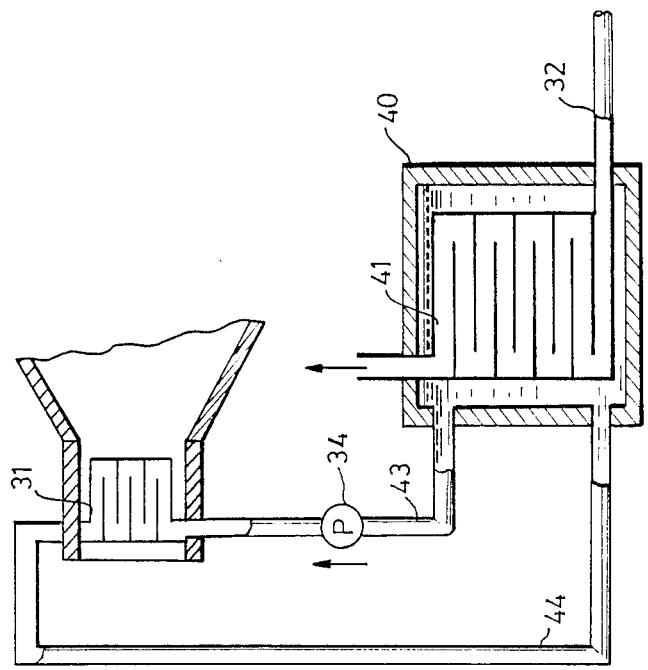
FIG. 2 is a cross sectional view taken along the line 2—2 of FIG. 1.
Figure 3:
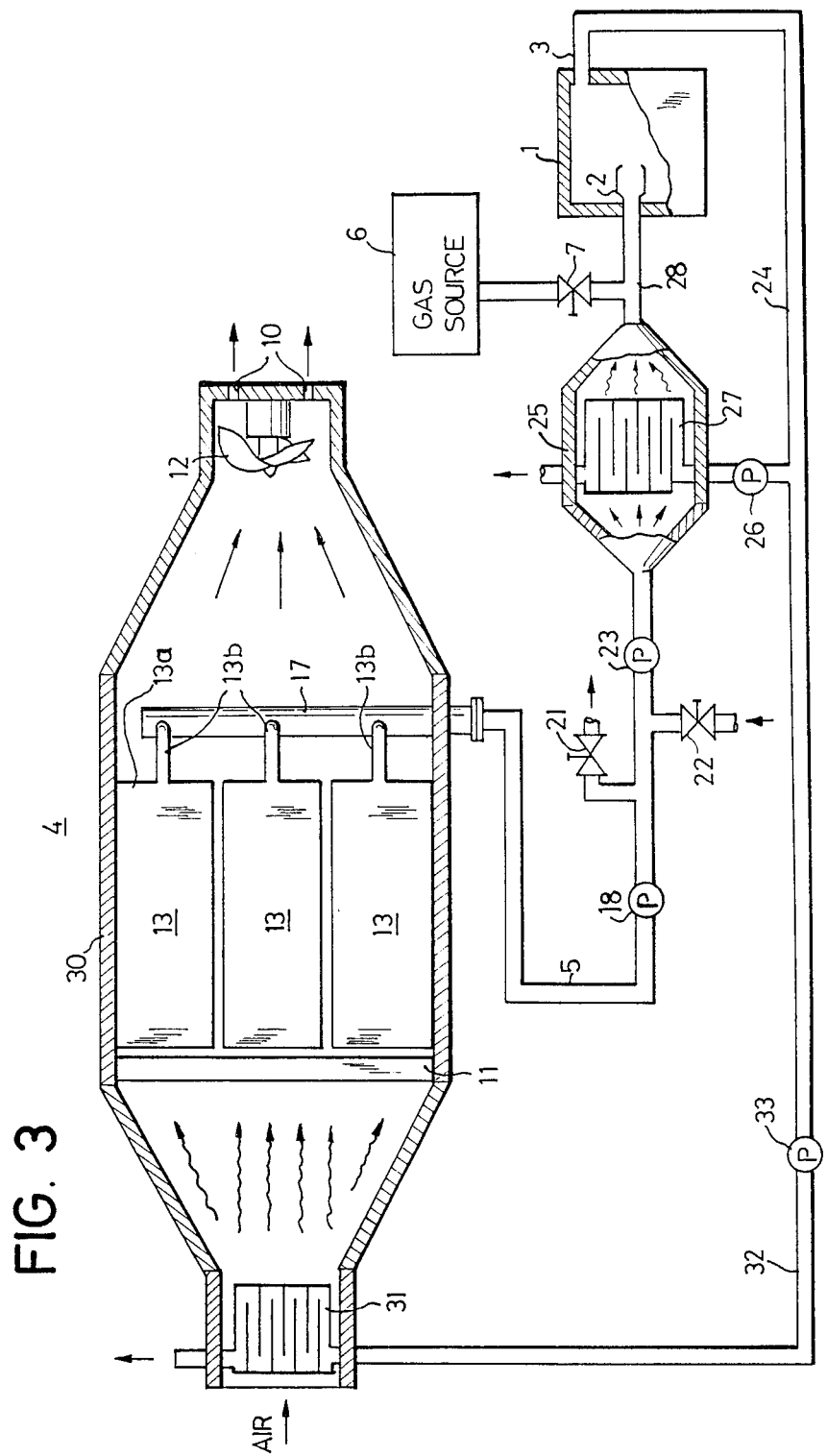
FIG. 3 is a diagrammatic view of a second embodiment of the invention.

The oxygen enriching apparatus 4 comprises a housing 8 having an air intake opening 9 and air exhaust openings 10, and an air filter 11 located at the intake opening 9 for screening dust and particles contained in air. A suction fan 12 is located adjacent to the outlet openings 10. Located between the filter 11 and the fan 12 is a set of oxygen enriching modules 13 stacked one upon another as illustrated in FIG. 1. Each module comprises a plurality of transversely spaced apart parallel cells 13a having a rectangular shape, as best seen in FIG. 2. Each cell 13 comprises a pair of oxygen permeable membranes 14 affixed to the opposite sides of a rectangular frame, not shown, and a filling material 15 such as fibers between the membranes 14. Air is drawn by the suction fan 12 to generate parallel air streams that pass through the spaces between cells 13a as indicated by arrows 16 in FIG. 2. The cells 13a have their downstream ends connected by a manifold 13b to a common vertical pipe 17 which is connected to the conduit 5. In the conduit 5 is provided a vacuum pump 18 for drawing air through the oxygen permeable membranes 14 as indicated by arrows 19.

In a preferred embodiment, the oxygen permeable membranes 14 are formed of polydimethylsiloxane having an oxygen permeability of $10^{-10}$ to $10^{-7}$ $cm^3/cm^2.sec.cmHg$ and an oxygen-to-nitrogen permeability ratio of k:1, where k is equal to or greater 2.

As the air is drawn by the vaccum pump 18, oxygen molecules are selectively passed through the membranes 14 and the air inside the cells 13a is enriched with oxygen while the air outside the membranes becomes enriched with nitrogen. The oxygen-enriched air emerges from the cells 13a as indicated by broken-line arrows 20 and is conducted through pipe 17 and conduit 5 to vacuum pump 18. On the other hand, the nitrogen-enriched air is exhausted by the suction fan 12 to the outside through the openings 10.

In the conduit 5 are provided an oxygen regulator valve 21 for discharging excess oxygen enriched to the outside, an air regulator valve 22 located downstream of the valve 21 for introducing outside air to the oxygen rich air, and a pump 23 for pressurizing the oxygen rich air to a level typically at 1000 mmHg. The pressurized air is mixed with fuel gas and discharged to the burner 2. The purpose of the pressurizing pump 23 is to eliminate the effect of pulsating pressure variations which would otherwise occur as a result of the sucking action of the vacuum pump 18.

An oxygen concentration as high as 30 percent can be obtained by the oxygen permeable membranes 14, which allows the air-fuel mixture to burn at a significantly high efficiency generating a heat as high as 1900° C. Since the oxygen permeating membranes are inexpensive in manufacture and reliable in operation, the furnace of the invention is economical both in installation and maintenance.

Still higher energy savings and temperatures are obtained by utilizing the exhaust heat of the combustion chamber 1. To this end, the exhaust port 3 of the combustion chamber 1 is connected by a conduit 24 to a heat exchanger 25 having a tube 27 therein. This heat exchanger is located between the pump 23 and a junction 28 where fuel and air are mixed. A pump 26 is provided to force the exhaust gases through the tube 27 to the outside for effecting the transfer of thermal energy from the exhaust heat to the pressurized, oxygen enriched air.

The oxygen permeable membrane 14 exhibits a temperature dependent characteristic which causes the flow rate and oxygen concentration to vary as a function of temperature. To maintain the oxygen content constant, the oxygen enriching apparatus 4 is formed of a housing 30 having a heat exchanger 31 located at the inlet opening thereof and connected by a conduit 32 from the conduit 24. A pump 33 is connected in the conduit 32 to force the exhaust gases through the exchanger 31 to the outside to effect the preheating of the air. The thermal energy of the preheated air raises the temperature of the oxygen permeable membranes 14, and as a result the amount of oxygen molecules passing through the membranes 14 increases with the exhaust temperature. Since the temperature of the preheated air varies as a function of the temperature in the combustion chamber 1, the oxygen enriching cells 13 and hence the oxygen concentration and the air flow rate are maintained constant for a given operating condition of the combustion chamber 1. Experiments show that it is preferable that the oxygen permeable cells 13 be maintained at a temperature equal to or higher than 30° C.

Figure 4:
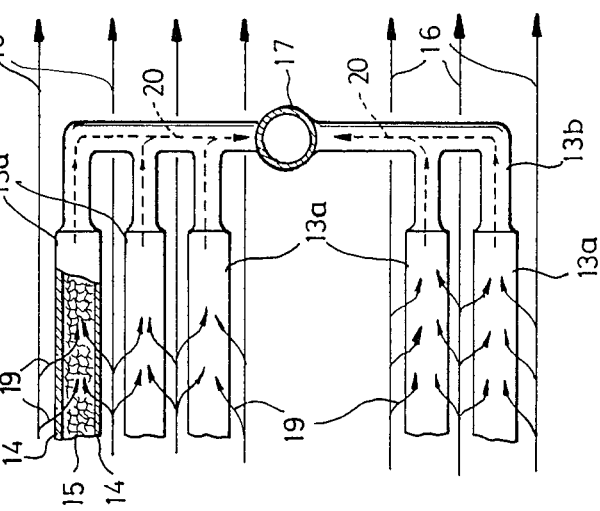
FIG. 4 is a diagrammatic view of a modified form of the embodiment of FIG. 3.

FIG. 4 is an illustration of a modified embodiment of the invention. This embodiment comprises a water tank 40 having a heat exchanger 41 connected to the exhaust conduit 32 to effect the transfer of thermal energy from the exhaust gases to the water contained in the water tank 40. The heated water is directed by a pump 34 through a conduit 43 to the heat exchanger 31 and returns through a conduit 44 to the water tank. Due to the fact that water has a higher energy transfer efficiency than air, a greater amount of energy is extracted from the exhaust gases than is available with the previous embodiment.

The foregoing description shows only preferred embodiments of the present invention. Various modifications will be apparent to those skilled in the art and may be practiced without departing from the scope of the present invention which is limited only by the appended claims. Therefore, the embodiments shown and described are only illustrative, not restrictive.

What is claimed is:

1. A high-temperature furnace comprising:
   a combustion chamber having a burner for burning a mixture of air and fuel therein and an exhaust outlet for exhausting emissions therefrom to the outside;
   a plurality of longitudinally extending, transversely spaced cells to form air passageways therebetween, each of said cells comprising a pair of transversely spaced-apart oxygen permeable membranes for selectively passing oxygen molecules from air in said air passageways to said cells so that the gaseous mixture in said cells is oxygen-enriched air, said air passageways having upstream ends and downstream ends;
   conduit means connected from downstream ends of said cells to said burner;
   first means for forcibly generating airstreams in said air passageways in a direction from said upstream ends to said downstream ends;
   second means in said conduit means for generating a negative pressure in said cells with respect to said air passageways to cause said oxygen-enriched air to flow forcibly to said burner; and
   pressure increasing means connected in said conduit means between said second means and said burner for increasing the pressure of oxygen-enriched air delivered to said burner.

2. A high-temperature furnace as claimed in claim 1, further comprising a fuel source connected to said conduit means at a point between said pressure increasing means and said burner and pressure regulating means connected between said fuel source and said point for supplying pressure-regulated fuel to said burner.

3. A high temperature furnace as claimed in claim 1, further comprising:
   heat exchanging means located at a point upstream of said air passageways for transferring thermal energy from said emissions to the air in said air passageways.

4. A high-temperature furnace as claimed in claim 3, wherein the air in said air passageways is heated by said heat exchanging means to a temperature equal to or higher than 30° C.

5. A high-temperature furnace as claimed in claim 3, further comprising a pump for forcing said emissions to said heat exchanging means.

6. A high temperature furnace as claimed in claim 3, wherein said heat exchanging means comprises a first heat exchanger located at a point upstream of said air passageways, a second heat exchanger connected between said first heat exchanger and the exhaust outlet of the combustion chamber by conduit means, and liquid thermal transferring medium circulating through said first and second heat exchangers, said second heat exchanger transferring thermal energy from said emissions to said liquid medium to increase the temperature of said medium flowing in a direction from said second heat exchanger to said first heat exchanger, said first heat exchanger transferring thermal energy from said liquid medium to the air in said air passageways.

7. A high-temperature furnace as claimed in claim 1, further comprising:
  first heat exchanging means located at a point upstream of said air passageways for transferring thermal energy from said emissions to said air in said air passageways; and
  second heat exchanging means connected in said conduit means between said pressure increasing means and said burner for transferring thermal energy from the emissions to said oxygenenriched air at a point downstream of said pressure increasing means.

8. A high-temperature furnace as claimed in claim 7, wherein said first means comprises a suction fan located at a point downstream of said air passageways.

9. A high-temperature furnace as claimed in claim 7, wherein said second means comprises a vacuum pump.

10. A high-temperature furnace as claimed in claim 7, wherein said membrane comprises polydimethylsiloxane.

11. A high-temperature furnace as claimed in claim 7, further comprising a fuel source connected to said conduit means at a point between said pressure increasing means and said burner and pressure regulating means connected between said fuel source and said point for supplying pressure-regulated fuel to said burner.

12. A high-temperature furnace as claimed in claim 7, further comprising first air-pressure regulating means connected to said conduit means at a point downstream of said second means for discharging pressure-regulated air to the outside, and second air-pressure regulating means connected to said conduit means at a point downstream of said first air-pressure regulating means for introducing outside air to said conduit means.

13. A high-temperature furnace as claimed in claim 7, further comprising a first regulator connected in said conduit means for discharging a part of air delivered from said second means, and a second regulator connected downstream of said first regulator for introducing outside air to said air delivered from said second means.

14. A high-temperature furnace comprising:
  a combustion chamber having a burner for burning a mixture of air and fuel therein and an exhaust outlet for exhausting emissions therefrom to the outside;
  a plurality of longitudinally extending, transversely spaced cells to form air passageways therebetween, each of said cells comprising a pair of transversely spaced-apart oxygen permeable membranes for selectively passing oxygen molecules from air in said air passageways to said cells so that the gaseous mixture in said cells is oxygen-enriched air, said air passageways having upstream ends and downstream ends;
  conduit means connected from downstream ends of said cells to said burner;
  first means for forcibly generating airstreams in said air passageways in a direction from said upstream ends to said downstream ends;
  second means in said conduit means for generating a negative pressure in said cells with respect to said air passageways to cause said oxygen-enriched air to flow forcibly to said burner; and
  first air-pressure regulating means connected to said conduit means at a point downstream of said second means for discharging pressure-regulated air to the outside, and second air-pressure regulating means connected to said conduit means at a point downstream of said first air-pressure regulating means for introducing outside air to said conduit means.

15. A high-temperature furnace as claimed in claim 14, further comprising a fuel source connected to said conduit means at a point between said pressure increasing means and said burner and pressure regulating means connected between said fuel source and said point for supplying pressure-regulated fuel to said burner.

16. A high temperature furnace as claimed in claim 14, further comprising:
  heat exchanging means located at a point upstream of said air passageways for transferring thermal energy from said emissions to the air in said air passageways.

17. A high-temperature furnace as claimed in claim 14, further comprising:
  first heat exchanging means located at a point upstream of said air passageways for transferring thermal energy from said emissions to said air in said air passageways; and
  second heat exchanging means connected in said conduit means between said pressure increasing means and said burner for transferring thermal energy from the emissions to said oxygen-enriched air at a point downstream of said pressure increasing means.

* * * * *